United States Patent [19]

Chopin et al.

[11] Patent Number: 4,983,563
[45] Date of Patent: Jan. 8, 1991

[54] MECHANICALLY IMPROVED SHAPED ARTICLES

[75] Inventors: Thierry Chopin, Saint Denis; Eric Quemere, Cormeilles en Parisis; Patrice Nortier, Romainville; Jean-Luc Schuppiser, Claye Souilly; Christian Segaud, Chassieu, all of France

[73] Assignee: Rhone-Poulenc Chimie, Courbevoie, France

[21] Appl. No.: 208,501

[22] Filed: Jun. 20, 1988

[30] Foreign Application Priority Data

Jun. 19, 1987 [FR] France .................................. 87 08606

[51] Int. Cl.$^5$ ............................................. B01J 31/26
[52] U.S. Cl. .................................... 502/150; 502/404; 501/103; 501/154; 501/153; 501/134
[58] Field of Search ................ 502/150, 404; 501/103, 501/154, 153, 134

[56] References Cited

U.S. PATENT DOCUMENTS

| | | | |
|---|---|---|---|
| 1,273,547 | 7/1918 | Sharples | 501/153 |
| 1,610,182 | 12/1926 | Thomson | 501/153 |
| 2,776,897 | 1/1957 | Hazelwood | 501/153 |
| 2,887,394 | 5/1959 | Bickford et al. | 501/153 |
| 3,379,543 | 4/1968 | Norwalk | 501/153 |
| 4,356,236 | 10/1982 | Koshugi | 502/404 |
| 4,477,579 | 10/1984 | Reven | 501/153 |
| 4,774,211 | 9/1988 | Hamilton et al. | 501/153 |

*Primary Examiner*—Patrick P. Garvin
*Assistant Examiner*—E. P. Irzinsky
*Attorney, Agent, or Firm*—Burns, Doane, Swecker & Mathis

[57] ABSTRACT

Shaped articles having improved mechanical properties, e.g., stronger catalysts and catalyst supports, are produced by shaping a mass of particulate material, e.g., ceramic powder, into the form of the desired final article, the particulate material including a microbially produced poly-saccharide compound, and then consolidating the shaped article by heat treating same, e.g., to sintering or calcination temperatures.

14 Claims, No Drawings

MECHANICALLY IMPROVED SHAPED ARTICLES

BACKGROUND OF THE INVENTION

1. Field of the Invention

The present invention relates to the production of shaped articles from particulates by shaping such divided materials into desired form and then heat treating same. More particularly this invention relates to the production of such shaped articles as catalyst supports, catalysts, adsorbents, ceramics, and the like, having improved mechanical properties.

2. Description of the Prior Art

Processes for the production of shaped articles from finely or coarsely divided materials, such as powders, are known to this art. They typically consist either of agglomerating the powder by granulation, pelleting, or extrusion, for example, or of molding the article after formulating a suspension or solution of the divided material, followed by drying the resulting shaped article, and subjecting it to a heat treatment to completely eliminate the water therefrom, thus producing a solid shaped article having mechanical properties suitable for the intended use thereof.

The heat treatment may be carried out at a more or less elevated temperature, depending on the article to be produced. Thus, in the production of adsorbents, catalysts or catalyst supports and, more generally, shaped articles having a high pore volume, the heat treatment consists of calcination at a temperature on the order of 600° C. to prevent the vanishing of the pores (which, in the case of ceramic articles, the heat treatment consists of sintering at an elevated temperature to produce a compact and dense product).

In the known processes, additives are introduced to facilitate the shaping operation. Nonetheless, the articles obtained after the heat treatment do not have good mechanical properties.

Thus, catalysts or catalyst supports based on alumina have relatively low crush resistance (ESH) or grain-to-grain crush resistance (EGG), which may lead to fracture during the handling of the catalyst or its use.

Furthermore, catalysts supports are typically impregnated with solutions of precursors of the elements constituting the catalytically active phase. The supports produced by the known processes may rupture or burst during such impregnation. The percentage of crushing or fracturing may be high as a function of the initial powder.

SUMMARY OF THE INVENTION

Accordingly, a major object of the present invention is the provision of an improved process for the production of shaped articles from particulate material which conspicuously avoids those disadvantages and drawbacks to date characterizing the state of this art, such shaped articles (after appropriate heat treatment, e.g., sintering or calcination) having appreciably improved mechanical properties and, when in the form of porous shaped articles, being well adapted for impregnation without bursting or rupturing.

Briefly, the present invention features the production of shaped articles from divided, particulate material, by adding at least one polysaccharide compound (obtained by bacterial or fungal fermentation) to such particulate material and then shaping and heat treating same.

DETAILED DESCRIPTION OF THE PREFERRED EMBODIMENTS OF THE INVENTION

More particularly according to the present invention, the presence of the at least one polysaccharide during the heat treatment makes it possible to produce shaped articles having enhanced mechanical properties.

Representative polysaccharide compounds obtained by bacterial fermentation and suitable for use according to the present invention are, for example, the xanthan gums, the succinoglycane gums, and the heteropolysaccharides S-194 described in European Pat. No. 77,680.

The xanthan gums are produced by the fermentation of a carbohydrate under the action of microorganisms and, more particularly, the bacteria belonging to the genus *Xanthomonas.*

These bacteria are described in Bergey's *Manual of Determinative Bacteriology* (8th Edition, 1974, Williams N. Wilkins Co., Baltimore), such as *Xanthomonas begoniae, Xanthomonas campestris Xanthomonas carotae, Xanthomonas hederae, Xanthomonas incanae, Xanthomonas malvacearum, Xanthomonas papavericola, Xanthomonas phaseoli, Xanthomonas pisi, Xanthomonas vasculorum, Xanthomonas vesicatoria, Xanthomonas vitians,* and *Xanthomonas pelargonii.* Among the other microorganisms capable of producing polysaccharides having similar properties are the bacteria belonging to the genus *Arthrobacter* and, more particularly, the species *Arthrobacter stabilis* and *Arthrobacter viscosus;* the genus *Erwinia;* the genus *Azotobacter* and, more particularly, the species *Azotobacter indicus;* the genus *Agrobacterium* and, more particularly, the species *Agrobacterium radiobacter, Agrobacterium rhizogenes* and *Agrobacterium tumefaciens.*

It will be appreciated that this list is given exclusively by way of example and is not limiting.

Representative polysaccharide compounds produced by fungal fermentation and suitable for use according to the invention are the scleroglucare gums synthesized by the fermentation of a carbohydrate by means of fungi belonging to the genus *Sclerotium* and, more particularly, the species *Sclerotium glucanicum* and *Sclerotium rolfsii.*

The polysaccharide compounds of the invention have a high molecular weight, advantageously higher than $10^6$. They typically are powders which may be dispersed in a liquid, advantageously water, or solubilized. These compounds exhibit pseudoplastic behavior in solution.

Consistent herewith, the desired final products are shaped from a divided or particulate material. By the term "divided or particulate material" are intended powders, agglomerates or similar materials.

The divided materials are shaped by known and conventional methods.

Thus, to be shaped, they may be either in the dry state, or in a moist, pasty, or liquid state, or in suspension, or else in the form of a gel obtained by the dispersion or mixing of the reagents.

The shaping processes that may be used depending on the state of the product (dry, moist, paste or liquid) are, for example, pelleting, compacting, granulating, tableting, extrusion, drying by atomization, droplet coagulation (also known as the "oil drop" process) and molding. The shaping process generally also comprises a dispersion stage, for example, kneading.

To facilitate the shaping process, conventional additives known to this art may be incorporated.

The particulate or divided material may be a compound, such as a metal oxide, a ceramic material, or a mixture of compounds.

Exemplary divided materials, in particular for the production of catalysts, catalyst supports and adsorbents, are the metallic oxides, such as alumina, titanium dioxide, silica, and zirconium oxide, as well as the metallic sulfides and, more generally, any inorganic compound used in the production of such articles.

All of the ceramic materials are suitable for use according to the present invention, whether of the oxide type, such as, for example, silica, silicates (mullite, cordierite, zircon, and the like), alumina, aluminates (spinels, and the like), aluminosilicates (clays, and the like), titanium dioxide ($TiO_2$), titanates ($BaTiO_3$, and the like), magnesia, zirconia, rare earth oxides ($ThO_2$, $CeO_2$, and the like), or the nonoxide type, such as, for example, boron carbide, silicon carbide, boron nitride or silicon nitride, or, finally, of the mixed type, such as, for example, silicon or aluminum oxynitride (Sialon).

It will be appreciated that these lists of compounds are not limiting and are given by way of example only. Mixtures of these compounds may also be used.

The resulting shaped articles are subsequently dried at a temperature on the order of 100° C. to 150° C.

Finally, the dried articles are subjected to a heat treatment, either calcination at a temperature of from 300° to 800° C. depending on the nature of the product, or sintering carried out at a higher temperature, preferably higher than 1,000° C.

Characteristically according to the present invention, the polysaccharides are present in the shaped article prior to the heat treatment in a weight proportion of from 0.2 to 5% relative to the divided material, advantageously from 0.4 to 3% by weight.

In order to further illustrate the present invention and the advantages thereof, the following specific examples are given, it being understood that same are intended only as illustrative and in nowise limitative.

EXAMPLE 1

An alumina based catalyst support was produced by mixing together boehmite having a specific surface of 230 $m^2/g$ and a pore volume of 0.5 $cm^3/g$ in the presence of 3% by weight nitric acid relative to the weight of the alumina, 60% water and 1% xanthan gum marketed by Rhone-Poulenc under the trademark Rhodopol.

The paste obtained was then extruded, dried and calcined at 600° C.

The catalyst support A produced according to the invention was subjected to impregnation tests to control the "fracture ratio" of the articles obtained.

The fracture ratio corresponds to the particles which burst during their immersion in water at 20° C.

It was determined by the immersion of 20 articles, in the present case 20 extrudates, in water and the determination of the number of articles which had burst. In particular, extrusions fracturing in the transverse direction were counted, as the resulting shaped articles had only a low mechanical strength and could not be used.

The bursting strength (ESH) was also determined by the Shell method, together with the grain-to-grain bursting strength (EGG), by the method according to ASTM standard 04 179-82 on the catalysts.

The results are reported in Table I below.

COMPARATIVE EXAMPLE 2

The procedure of Example 1 was repeated; however, the xanthan gum was not added to the boehmite. Catalyst B was produced, the properties of which were determined as in Example 1.

TABLE I

| Example | Article | Xanthan gum % | ESH MPa | EGG daN/mm | % Fracture |
|---|---|---|---|---|---|
| 1 | A | 1 | 1.46 | 2.38 | 2 |
| 2 | B | 0 | 1.12 | 1.06 | 4 |

EXAMPLES 3 TO 4

The operation was carried out in a manner similar to Example 1. The divided material was an alumina gel containing 20% water, marketed under the trademark Condea gel.

To the alumina gel, 2% by weight xanthan gum was added, relative to the alumina, in the powder form.

After extrusion, drying and calcination at a temperature of 600° C., an article (C) useful as a catalyst support was produced.

From the same alumina gel and by the same process, but without the xanthan gum, a catalyst support (D) was produced.

The properties of the respective shaped articles are reported in Table II:

TABLE II

| Example | Article | Xanthan gum % | ESH MPa | EGG daN/mm | % Fracture |
|---|---|---|---|---|---|
| 3 | C | 2 (powder) | 0.98 | 1.90 | 0 |
| 4 | D | 0 | 0.79 | 1.34 | 22 |

EXAMPLES 5 TO 8

In these examples, the xanthan gum was added in different proportions and in the form of an aqueous solution to an alumina gel. The catalyst supports were obtained by the process described in Example 1.

The experiments and results are reported in Table III:

TABLE III

| Example | Article | Xanthan gum % | ESH MPa | EGG daN/mm | % Fracture |
|---|---|---|---|---|---|
| 5 | E | 0 | 0.96 | 1.76 | 8 |
| 6 | F | 0.25 (solution) | 1.10 | 1.87 | 2 |
| 7 | G | 0.5 (solution) | 1.12 | 2.11 | 0 |
| 8 | H | 3 Powder | 1.33 | 2.15 | 0 |

Examples 1 to 8 clearly show the effect of the addition of xanthan gum and, more generally, of a polysaccharide according to the invention, on the mechanical properties and strength in impregnation of porous articles based on alumina.

EXAMPLES 9 TO 12

A suspension or barbotine (paste) was prepared containing ceramic material and having the following composition of solids:
(i) 30% kaolin, uncalcined;
(ii) 62% calcined kaolin:

(iii) 7.7% talc; and
(iv) 0.3% sodium hexametaphosphate.

The ceramic obtained by the casting and drying of the suspension and the subsequent sintering of the crude article at a temperature of 1,400° C. was of the porcelain type.

Several ceramic articles were produced by adding to the suspension different quantities of xanthan gum, expressed relative to the ceramic material.

The rupture strength of the final ceramic was measured by means of a ZWICK dynamometer.

The results are reported in Table IV:

TABLE IV

| Example | Xanthan gum % by weight | Rupture strength (MPa) |
|---|---|---|
| 9 | 0 | 64 |
| 10 | 0.4 | 84 |
| 11 | 0.7 | 128 |
| 12 | 1 | 92 |

EXAMPLES 13 TO 15

A catalyst based on titanium dioxide and, more particularly, on anatase, was produced by preparing a titanium gel by the addition of water and nitric acid to an anatase powder. The gel obtained had an ignition weight loss of 40% and a quantity by weight of acid between 6 and 10% relative to the titanium dioxide.

The gel was extruded after mixing, the product obtained was dried at 100°–120° C. and then calcined at 350° C.

The grain-to-grain crush strength (EGG) of the catalysts obtained with varying amounts of xanthan gum were determined and expressed relative to the titanium dioxide.

The results are reported in Table V:

TABLE V

| Example | Xanthan gum % | Pore volume cm$^3$/g | EGG daN/mm |
|---|---|---|---|
| 13 | 0 | 0.30 | 1.00 |
| 14 | 1.5 | 0.30 | 1.53 |
| 15 | 3 | 0.30 | 1.80 |

These catalysts were used, in particular in the Claus process, their catalytic activity being similar to that of catalysts containing no xanthan gum or polysaccharides according to the invention.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the production of a shaped porous article having improved mechanical properties, which comprises shaping a mass of particulate material into the form of desired final porous article, said particulate material including an effective amount for improving mechanical properties of at least one polysaccharide compound, and the consolidating said shaped porous article by heat treating at a calcination temperature to provide a shaped porous article comprising a catalyst or a catalyst support.

2. The shaping process as defined by claim 1, said at least one polysaccharide compound having been produced by bacterial or fungal fermentation of a carbohydrate.

3. The shaping process as defined by claim 2, said at least one polysaccharide compound having a molecular weight of at least $10^6$ and exhibiting pseudoplastic behavior in solution.

4. The shaping process as defined by claim 2, said at least one polysaccharide compound comprising a xanthan gum, a succinoglycane gum or a scleroglucane gum.

5. The shaping process as defined by claim 2, said at least one polysaccharide compound comprising a powder.

6. The shaping process as defined by claim 2, said at least one polysaccharide compound comprising a solution thereof.

7. The shaping process as defined by claim 2, said at least one polYsaccharide compound comprising a xanthan gum produced by Xanthomonas fermentation.

8. The shaping process as defined by claim 2, said at least one polysaccharide compound having been produced by Arthrobacter, Erwinia, Azotobacter or Agrobacterium fermentation.

9. The shaping process as defined by claim 2, said desired final article comprising from 0.2% to 5% by weight of said at least one polysaccharide compound.

10. The shaping process as defined by claim 9, said desired final article comprising from 0.4% to 3% by weight of said at least one polysaccharide compound.

11. The shaping process as defined by claim 2, said particulate material comprising divided ceramic material.

12. The shaping process as defined by claim 2, said divided ceramic material comprising metal oxide powder.

13. The shaping process as defined by claim 12 said divided ceramic material comprising an oxide of aluminum, titanium, silicon or zirconium.

14. A shaped article comprising the product of the shaping process as defined by claim 1.

* * * * *